United States Patent
Dietz et al.

(10) Patent No.: US 12,122,674 B2
(45) Date of Patent: Oct. 22, 2024

(54) CONDUCTIVE MATRIX AND SULFUR COMPOSITE

(71) Applicant: TDA Research, Inc, Wheat Ridge, CO (US)

(72) Inventors: Steven Dean Dietz, Denver, CO (US); Jeremy Noce, Lakewood, CO (US)

(73) Assignee: TDA Research, Inc., Golden, CO (US)

(*) Notice: Subject to any disclaimer, the term of this patent is extended or adjusted under 35 U.S.C. 154(b) by 617 days.

(21) Appl. No.: 17/609,737

(22) PCT Filed: May 4, 2020

(86) PCT No.: PCT/US2020/031337
§ 371 (c)(1),
(2) Date: Nov. 8, 2021

(87) PCT Pub. No.: WO2021/025745
PCT Pub. Date: Feb. 11, 2021

(65) Prior Publication Data
US 2022/0234893 A1    Jul. 28, 2022

Related U.S. Application Data

(60) Provisional application No. 62/842,741, filed on May 3, 2019.

(51) Int. Cl.
- *C01B 32/05* (2017.01)
- *H01M 4/583* (2010.01)
- *H01M 10/052* (2010.01)

(52) U.S. Cl.
CPC .......... *C01B 32/05* (2017.08); *H01M 4/583* (2013.01); *H01M 10/052* (2013.01);
(Continued)

(58) Field of Classification Search
CPC ....... C01B 32/05; C01B 32/336; C01B 32/30; C01B 32/306; C01B 32/312;
(Continued)

(56) References Cited

U.S. PATENT DOCUMENTS

| | | | |
|---|---|---|---|
| 2003/0153636 A1* | 8/2003 | Dietz | B01J 20/28057 521/50 |
| 2015/0044516 A1* | 2/2015 | Kyrlidis | H01M 10/06 429/232 |
| 2018/0062179 A1* | 3/2018 | Wada | H01M 4/623 |

FOREIGN PATENT DOCUMENTS

WO   WO 2015/158327   * 11/2015   .............. B01J 21/18

OTHER PUBLICATIONS

Zhang, et al., Graphitized porous carbon microspheres assembled with carbon black nanoparticles as improved anode materials in Li-ion batteries, J. Mater. Chem. A 2014; 2: 10161-10168 (Year: 2014).*

* cited by examiner

*Primary Examiner* — Daniel C. McCracken
(74) *Attorney, Agent, or Firm* — Brian J. Elliott

(57) ABSTRACT

An activated carbon-coated carbon black material having a nitrogen BET surface area of about 850 to 1800 $m^2/g$, a packing density of at least 0.8 g/cc as determined at a compressive force of 500 $kgf/cm^2$ on dry carbon powder, an electrical conductivity of a least 10 S/cm at a compressive force of 500 $kgf/cm^2$ on dry carbon powder and electrodes and batteries comprising the carbon material. Methods for preparing such carbon materials from sugar, dextrose, oils and carbon black are described. The material is comprised of carbon black particles coated with a porous activated carbon shell.

15 Claims, 11 Drawing Sheets

(52) U.S. Cl.
CPC ...... *C01P 2006/10* (2013.01); *C01P 2006/12* (2013.01); *C01P 2006/40* (2013.01)

(58) Field of Classification Search
CPC ..... C01B 32/318; C01B 32/324; C01B 32/33; C01B 32/342; C01B 32/348; C01B 32/354; C01B 32/36; C01B 32/366; C01B 32/372; C01B 32/378; C01B 32/382; C01B 32/384; C01B 32/39; H01M 4/583; H01M 10/052; H01M 4/0471; H01M 4/136; H01M 4/1397; H01M 4/625; C01P 2006/10; C01P 2006/12; C01P 2006/40; C01P 2006/14; C01P 2006/90; Y02E 60/10

See application file for complete search history.

$$Li^0 \longrightarrow Li^+ + e^- \quad \text{(anode)}$$

$$S_x + 2e^- \longrightarrow S_{x-y} + S_y^{2-}{}_{(liq)} \quad \text{(cathode)}$$

$$S_y^{2-}{}_{(liq)} + 4e^- + 4Li^+ \longrightarrow S_{y-2}^{2-}{}_{(liq)} + 2Li_2S_{(s)} \quad \text{(cathode)}$$

$$S_x + 4Li^0 \longrightarrow 2Li_2S_{(s)} + S_{x-y} + S_{y-2}^{2-}{}_{(liq)} \quad \text{(overall)}$$

Fig. 1

CONDUCTIVE MATRIX AND SULFUR COMPOSITE

CROSS REFERENCE TO RELATED APPLICATIONS

The present application claims the benefit of the provisional application No. 62/842,741 filed May 3, 2019 (titled CONDUCTIVE MATRIX, by Steven Dietz), which is incorporated by reference herein. The present application also claims the benefit of the PCT application number PCT/US20/31337 filed May 4, 2020 (titled CONDUCTIVE MATRIX AND SULFUR COMPOSITE, by Steven Dean Dietz and Jeremy Noce), which is incorporated by reference herein.

STATEMENT REGARDING FEDERALLY SPONSORED RESEARCH OR DEVELOPMENT

This invention was made using U.S. government funding through the U.S. Naval Air Warfare Center Aircraft Division contract N68335-17-C-0202. The government has certain rights in this invention.

BACKGROUND OF THE INVENTION

Batteries with multi-electron redox materials promise better performance than Li-ion batteries. Lithium-sulfur (Li—S) batteries have two electron cathode materials (in addition to a lithium metal anode) and better than two times the specific energy of Li-ion batteries. However, several issues have prevented Li—S batteries from becoming commercially viable. The sulfur cathode is both ionically and electronically insulating and so requires a conductive matrix. Most importantly, cycle life is limited by diffusion of polysulfides to the anode where they are reduced to Li—$S_2$ and become inactive; historically the cycle life has therefore been poor.

The traditional carbon cathode matrix for Li—S batteries has been carbon black. However, it lacks structural integrity as a cathode. Other carbon matrix forms have been used as well, including coke, graphite and carbon fiber. The cathode materials are made by using melt infusion of the sulfur into the carbon matrix at a temperature above the melting point of sulfur (115° C.). The sulfur exists as a two phase (carbon/sulfur) mixture prior to the first discharge. Upon the first discharge of the Li—S battery, the elemental sulfur is converted into soluble polysulfides that are soluble in the electrolyte. The chemical reactions of the Li—S battery are shown in FIG. 1.

Li—S batteries have an exceptional theoretical capacity of 1165 mAh/g for active materials (lithium and polysulfides) or 2330 mWh/g for the 2V discharge profile, compared to 200 mAh/g and 780 mWh/g for Li-ion battery cathodes ($LiCoO_2$). Practical specific energies of >300 Wh/kg and a power of 8 C have been demonstrated (twice as good as lithium-ion batteries), but historically the cycle life has been relatively poor. The cathode is comprised of polysulfide solutes in an organic electrolyte matrix, and requires an intimate conductive matrix, since the polysulfides are electronically insulating. The polysulfides are mobile in the electrolyte and can diffuse to the anode and be reduced to $Li_2S$. This is partly beneficial because it enables the lithium anode to be repeatedly charged and discharged by preventing lithium dendrite formation and inhibiting electrolyte reduction. It also provides a shuttle mechanism that protects against overcharging. However, it is detrimental since it leads to self-discharge and loss of active material, and thus must be moderated to achieve a reasonable life.

There are two major types of amorphous carbons: activated carbons and carbon blacks. Amorphous carbons do not have long-range crystalline order, which excludes other forms (allotropes) of elemental carbon such as diamond, graphite, graphenes, fullerenes or nanotubes. Activated carbons have high surface areas and internal porosity (mostly micropores and mesopores), but low electrical conductivity. In contrast, carbon blacks consist of small agglomerates of nanoparticles with little internal porosity and high electrical conductivities.

U.S. Pat. No. 8,173,302 B2 teaches an electrode material having carbon and sulfur is provided. The carbon is in the form of a porous matrix having nanoporosity and the sulfur is sorbed into the nanoporosity of the carbon matrix. The carbons of U.S. Pat. No. 8,173,302 B2 rely on a complicated templated structure and sulfur particles that are larger than the smallest passages in the templated structure to hold them in place. Their manufacture is impractical due to the required templated structure.

U.S. Pat. No. 9,053,871 B2 teaches high surface area carbon blacks for energy storage applications. These carbons have a low packing density and suffer from low theoretical energy density when used as cathodes in lithium-sulfur batteries.

One limitation with conductive carbon blacks is that they do not pack efficiently. For example, they cannot reach a packing density of at least 0.8 g/cc at a compressive force of 500 $kgf/cm^2$ on dry powder. On the other hand, a limitation of activated carbons is that the poor electrical conductors. For example, they cannot reach a conductivity of at least 10 S/cm (when measured at a compressive force of 500 $kgf/cm^2$ on dry powder.) While there are examples of high surface area carbon blacks, they have been plagued by very low packing density (U.S. Pat. No. 9,053,871 B2). This increases the volume of the electrode and battery resulting in low volumetric energy densities. There is a need for carbon materials which exhibit a combination of properties of activated carbons (high surface area) and carbon blacks (high conductivity) and that can be densely packed.

BRIEF SUMMARY OF THE INVENTION

The present invention teaches a carbon with high porosity, high electrical conductivity and high packing (or high density). In an embodiment the present invention teaches a carbon with critical properties to enable lithium-sulfur batteries with long cycle life. Further, high packing of the carbon is important to achieve higher energy density in batteries and it is also important to from structures such as electrodes with suitable mechanical integrity.

To prepare highly conductive carbons with high surface areas and high packing densities, we coated conventional carbon black with sugar mixtures and after carbonization produced an activated carbon-coated carbon black to make carbon materials that have high surface areas and high electrical conductivities (FIG. 2).

This product is fundamentally different than mixing carbon black with activated carbon, like is typically done in battery electrodes to increase their electrical conductivity. In that case the activated carbon and carbon black particles remain separate and distinct, whereas the present invention is a more homogenous carbon material with properties that are unique compared to either activated carbon or carbon black. The activated carbon portion of our material coats the outside of a carbon black core. The plurality of activated carbon-coated carbon black particles is critical for enabling the unique properties described herein. In particular, the combination of high surface area, electrical conductivity and density once compressed is unique. Further, the carbons of the present invention contain 2-100 nm pores in the activated carbon shell or coating that are suited for deposition of sulfur for lithium-sulfur cathode materials. Even further, the activated carbon may contain sulfur, nitrogen or other hetero atoms bound into the carbon structure that assist in retaining the deposited sulfur or polysulfides that form in a cathode made from the carbons of the present invention. The mechanisms for retaining the sulfur or polysulfides include Van der Waals forces, ionic forces, surface solubility, other physisorption forces, and the like.

The carbon matrixes, when used as the support for the polysulfides show high reversible capacities and long cycle life. This high utilization is attributed to the conductive mesoporous carbon matrix and inhibition of diffusion by the pore structure. In addition, we can add heteroatoms such as sulfur to the carbons to improve the electrochemical properties. The incorporation of sulfur on the carbon surface can restrain the diffusion of the soluble polysulfides and retard the shuttle effect of Li—S batteries.

An advantage of carbons of the present invention is that they are far easier and less expensive to produce than templated carbons of U.S. Pat. No. 8,173,302 B2. They are also fundamentally different in structure and have a high capacity, a high density and have an exceptionally long cycle life in lithium-sulfur batteries.

These conductive matrixes are useful for a number of energy storage applications including, but not limited to, cathodes for lithium-sulfur batteries, electrodes for double-layer capacitors, catalyst support for fuel cell electrodes and the gas diffusion layer and as a conductive additive for lead acid batteries.

An embodiment of the invention is a porous carbon that has: a nitrogen BET surface area of about 850 to 1800 $m^2/g$, a packing density of at least 0.8 g/cc as determined at a compressive force of 500 $kgf/cm^2$ on dry carbon powder, and an electrical conductivity of a least 10 S/cm at a compressive force of 500 $kgf/cm^2$ on dry carbon powder. In a preferred embodiment the carbon content is at least 94 weight % and the sulfur content of at least 0.6 weight %. In a preferred embodiment the packing density is at least 1.0 g/cc and 500 $kgf/cm^2$. The porous carbon of claim may have a pore volume of pores from 2 to 100 nm is at least 0.5 cubic centimeters per gram, preferably at least 1.0 cubic centimeters per gram.

Another embodiment is a carbon matrix-sulfur composite, wherein the carbon matrix comprises the porous carbon of claim 1, wherein sulfur is deposited into the pores of the carbon matrix, and the sulfur content is at least 50 weight % of the carbon matrix-sulfur composite, preferably wherein the at least 50 weight % sulfur is deposited inside 2-100 nanometer-sized pores in the carbon matrix. In another preferred embodiment, the carbon matrix-sulfur composite of claim 4, wherein the sulfur is at least 70 weight % of the carbon matrix-sulfur composite and the sulfur is deposited inside 2-100 nanometer-sized pores in the carbon matrix.

Another embodiment is a cathode for a lithium-sulfur battery comprising the carbon matrix-sulfur composite, or a lithium-sulfur battery comprising the cathode.

Another embodiment is a product-by-process with all the inherent properties of the product as made by the process: an activated carbon-coated carbon black material made by the steps of: providing a plurality of carbon black particles a carbohydrate in the form of a refined sugar and an oil; coating the plurality of carbon black particles with the carbohydrate and the oil; carbonizing the carbohydrate which is coated on the plurality of carbon black particles under a nitrogen atmosphere; and, activating the carbohydrate which is carbonized on the plurality of carbon black particles under a steam or carbon dioxide atmosphere.

Another embodiment is a carbon matrix-sulfur composite, wherein the carbon matrix is made by the steps in the paragraph above, and a sulfur composite is made by the additional steps of: providing a sulfur powder; mixing the carbon matrix with the sulfur powder; placing the carbon matrix with the sulfur powder inside a pressure vessel; pulling a vacuum on the pressure vessel; heating the vessel to at least 150 degrees Celsius; and, heating the carbon matrix and the sulfur powder for a period of time to allow the sulfur to deposit inside pores with a diameter from 2 to 100 nm. Other embodiments are a cathode for a lithium-sulfur battery comprising the carbon matrix-sulfur composite or a lithium-sulfur battery comprising said cathode.

BRIEF DESCRIPTION OF THE DRAWINGS

FIG. 1. Chemical reactions for the Li—S battery.

DETAILED DESCRIPTION OF THE INVENTION

Figure 2:
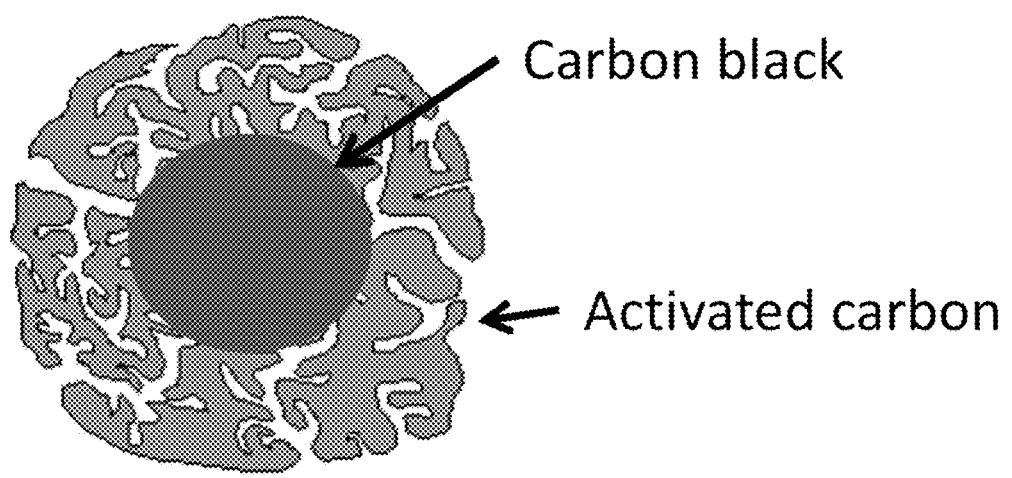
FIG. 2. Representation of activated carbon coated carbon black of the invention.

The present invention provides mesoporous carbons (pores 2-100 nm) that function as the matrix for sulfur and polysulfides in cathodes for lithium-sulfur batteries. The carbons were derived from carbohydrates and carbon black. We can incorporate elements such as nitrogen, sulfur, phosphorous and others into carbohydrate-derived carbons. This is done by adding compounds with the desired element to the mixture before carbonization. The elements are bound tightly into the activated carbon and cannot be easily removed. These carbons coat the carbon black which increases the electrical conductivity of the carbons.

The key advantages of our carbon technology are low cost and high purity and most importantly, our ability to tailor the pore size; these advantages stem directly from our use of refined sugar precursors. The invention uses carbons based on refined sugars, such as sucrose or high fructose corn syrup, because the resulting carbons have the high intrinsic purity needed for use in electrochemical devices. Conventional activated carbons made from natural products, such as coconut shells, coal or wood have 2-5% ash content, compared to <1% for our carbons. Because of their high purity, our porous carbons have electrical conductivities that are comparable to carbon blacks (10-30 S/cm), while conventional activated carbons have conductivities of <2 S/cm. Many starting materials for carbons are possible, and many are based on natural by-products. Starting with impure carbon precursors such as coconut shells results in carbons with impurities, which must be removed in expensive subsequent processing. Because refined sugars are purified by crystallization in high volume for the food industry, they are a very pure but inexpensive starting material for carbons.

By controlling the process conditions and adding pore formers, we have developed the capability to independently control the distribution of mesopores (with pore diameters between 2 and 100 nm) and micropores (diameters<2 nm). The pore diameter in the mesopore range is controlled by the amount of pore former in the formulation, while we control formation of micropores during the activation step. Our control of the mesopore size is the key to how we design the pore size to contain the polysulfides in a way that will both immobilize them and allow for their expansion.

The traditional carbon cathode matrix for Li—S batteries has been carbon black. However, it lacks any structural integrity as a cathode and has poor surface area. The cathode materials are made by using melt infusion of the sulfur into the carbon matrix at a temperature above the melting point of sulfur (115° C.). The sulfur exists as a two phase (carbon/sulfur) mixture prior to the first discharge. Upon the first discharge of the Li—S battery, the elemental sulfur is converted into soluble polysulfides that are soluble in the electrolyte Conventional activated carbons are not usually considered to be suitable as electrodes for electronic applications because they are made from natural precursors, such as wood, coconut shells and coal, and therefore have high amount of impurities (metals and ash, 3-7%) and low electrical conductivities. To address this problem the invention provides electronic grade carbons from high purity sugars such as sucrose, glucose, fructose and corn starch with <1% ash. Because of the high purity of the carbons of the present invention, they exhibit high electrical conductivities that are much greater than commercial activated carbons In addition, we have patented several methods to control the pore size distribution of these carbons [U.S. Pat. No. 6,297,293, 2001, U.S. Pat. No. 6,737,7, U.S. Pat. No. 167,354, 2007, U.S. Pat. No. 7,541,312, 2009 and U.S. Pat. No. 9,120,079, which are incorporated by reference herein].

The first step in the hydrolysis of common sugar (sucrose) is the cleavage of an ether linkage to produce a 50/50 mixture of glucose and fructose (Scheme 1). Alternatively, the ratio of glucose and fructose can be changed by starting with mixture of pure fructose and glucose.

Scheme 1

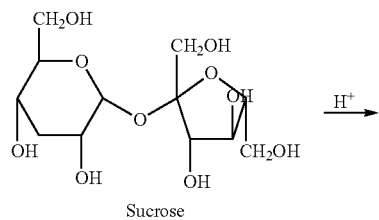

Sucrose

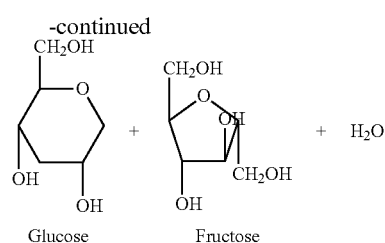

Glucose    Fructose

Regardless of which sugar is used, the next step is the acid hydrolysis of these compounds (generically called hexoses since they all have the same molecular formula, $C_6H_{12}O_6$). The acid hydrolysis of hexoses generates mainly 5-hydroxymethylfurfural, levulinic acid and formic acid (Scheme 2). Then with continued heating the 5-hydroxymethylfurfural and levulinic acid polymerize with the further loss of water to leave behind char, which is mostly carbon with a small amount of residual hydrogen and oxygen. When the char is carbonized (i.e. >500° C. in an inert atmosphere) the polymer decomposes, evolving mainly $CO_2$, CO and water to give a high purity carbon.

Scheme 2.

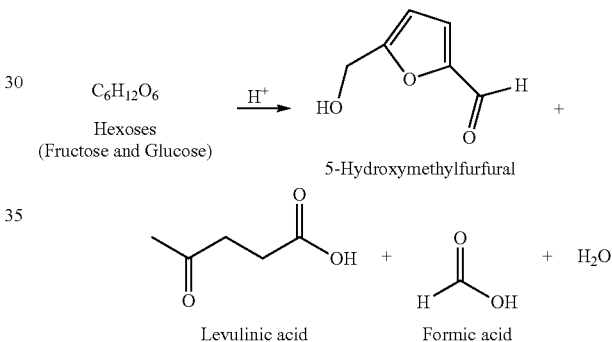

In addition, we can add nitrogen to the carbons to improve the electrochemical properties. The incorporation of nitrogen in the carbon can enhance the electrical conductivity, restrain the diffusion of the soluble polysulfides and retard the shuttle effect of Li—S batteries. With the use of nitrogen containing compounds and control of their quantity, we can control the type and concentration of the nitrogen functional groups in the carbon.

Figure 3:
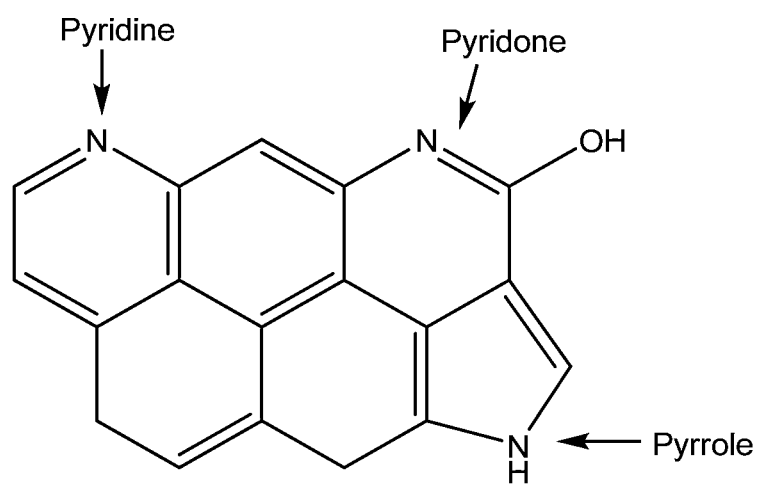
FIG. 3. Nitrogen functionalities in activated carbon coating.

For example, we can add nitrogen to the carbon structure by mixing ammonium compounds (e.g. urea, glycine, melamine) during synthesis, which intrinsically produce a carbon with high concentrations of nitrogen groups that are similar to pyridines or pyrroles. X-ray Photoelectron Spectroscopy (XPS) shows the nitrogen is bonded into the carbon structure as a cyclic amine (FIG. 3) and not as an oxidized species (not as nitrites or nitrates). By proper selection of the type and quantity of the ammonium compounds, we can control the concentration and functionality of the nitrogen groups dispersed in the carbon surface.

Figure 4:
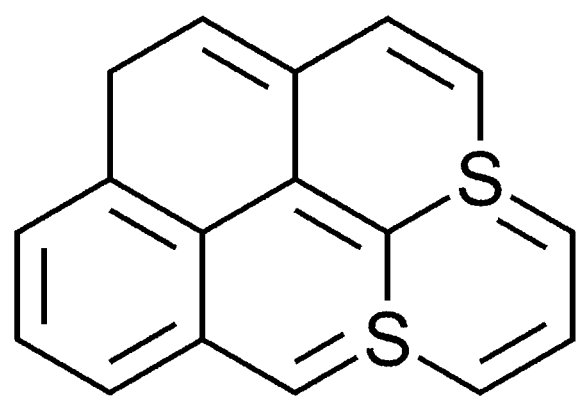
FIG. 4. Sulfur functionalities in activated carbon coating.

We can add heteroatoms such as sulfur to the carbons to improve the electrochemical properties. The incorporation of sulfur on the carbon surface can restrain the diffusion of the soluble polysulfides and retard the shuttle effect of Li—S batteries. These carbon formulations have sulfur because the carbon black contains bound sulfur which can help attract the polysulfides to the carbon surface. The sulfur is bonded into the carbon structure as a cyclic sulfide (FIG. 4) and not as an oxidized (sulfate) or reduced species (thiol).

General synthesis and characterization of porous carbon. We synthesized and characterized the mesoporous carbons that function as the matrix for the polysulfides. The carbons were derived from carbohydrates. The invention can incorporate elements such as nitrogen, sulfur, and other hetero atoms into carbohydrate-derived carbons. This is done by adding compounds with the desired element to the mixture before carbonization. The elements are bound tightly into the carbon and cannot be easily removed.

Figure 5:
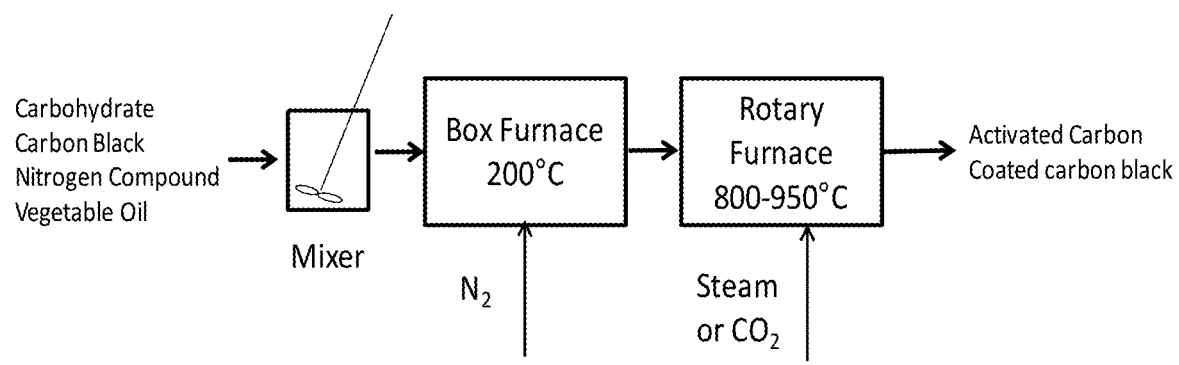
FIG. 5. Schematic of activated carbon coated carbon black production process.

As shown schematically in FIG. 5, the general procedure for preparing these porous carbons was to:
Step 1: Mix ingredients.
Step 2: Dry in air at 200° C.
Step 3: Crush and screen.
Step 4: Carbonize and activate in a rotary furnace under a flow of carbon dioxide at 950° C. for different lengths of time.

During heating the carbohydrate decomposes to make a char. The nitrogen or sulfur containing compounds and carbon black are homogeneously dispersed throughout the char, preventing agglomeration of the particles. During carbonization, the char and nitrogen containing compounds decompose to give a high purity carbon with the nitrogen covalently bound to the carbon ring structure.

To activate the carbons, we used a small rotary kiln with a 4" quartz tube that can produce 50-100 g batches of carbon. The final product was ball-milled and screened to minus 400 mesh.

Figure 6:
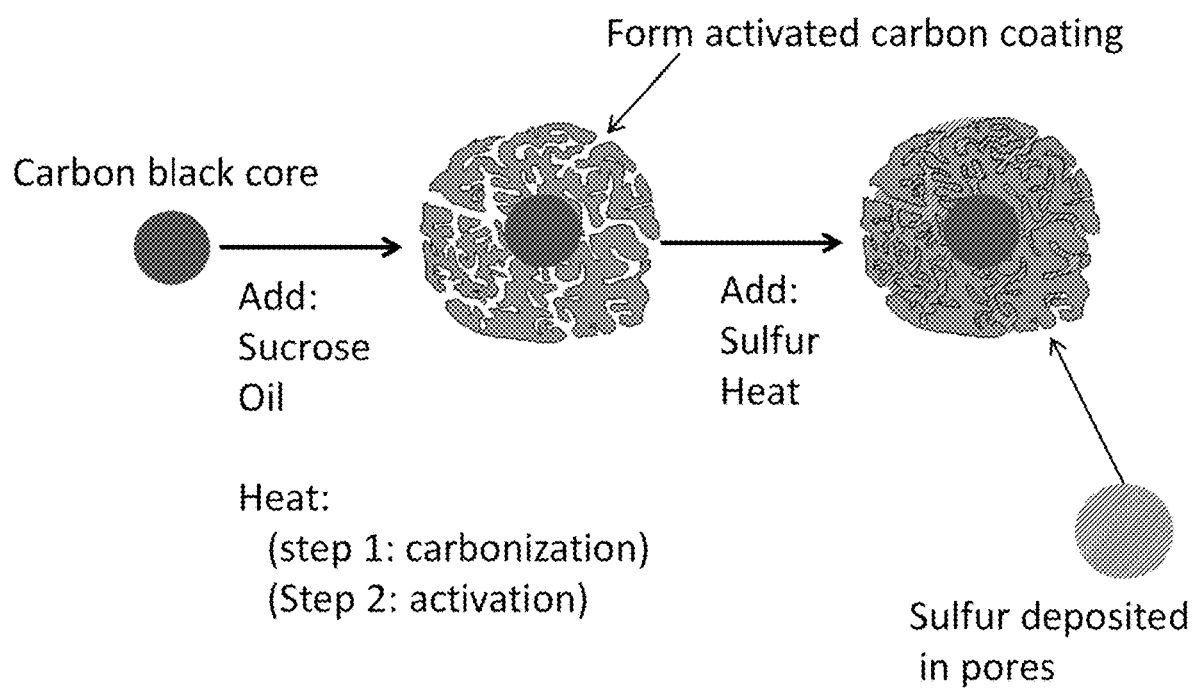
FIG. 6. Process for making and physical structural representation of the activated carbon coated carbon black material
FIG. 7. P&ID of sulfur intercalation apparatus.

General procedure to fill pores of the activated carbon coating with sulfur active material. The porous carbons may be filled with the active material sulfur (FIG. 6). The ratio of sulfur to pore space is an important consideration, since the final discharge material, $Li_2S$, has an 80% volume expansion relative to S. It is advantageous to fill the nanopores with S, not the interstitial pores. Therefore, it is important to understand the relative pore size of nanopores and interstitial pores, which is obtained from nitrogen adsorption experiments.

Figure 7:
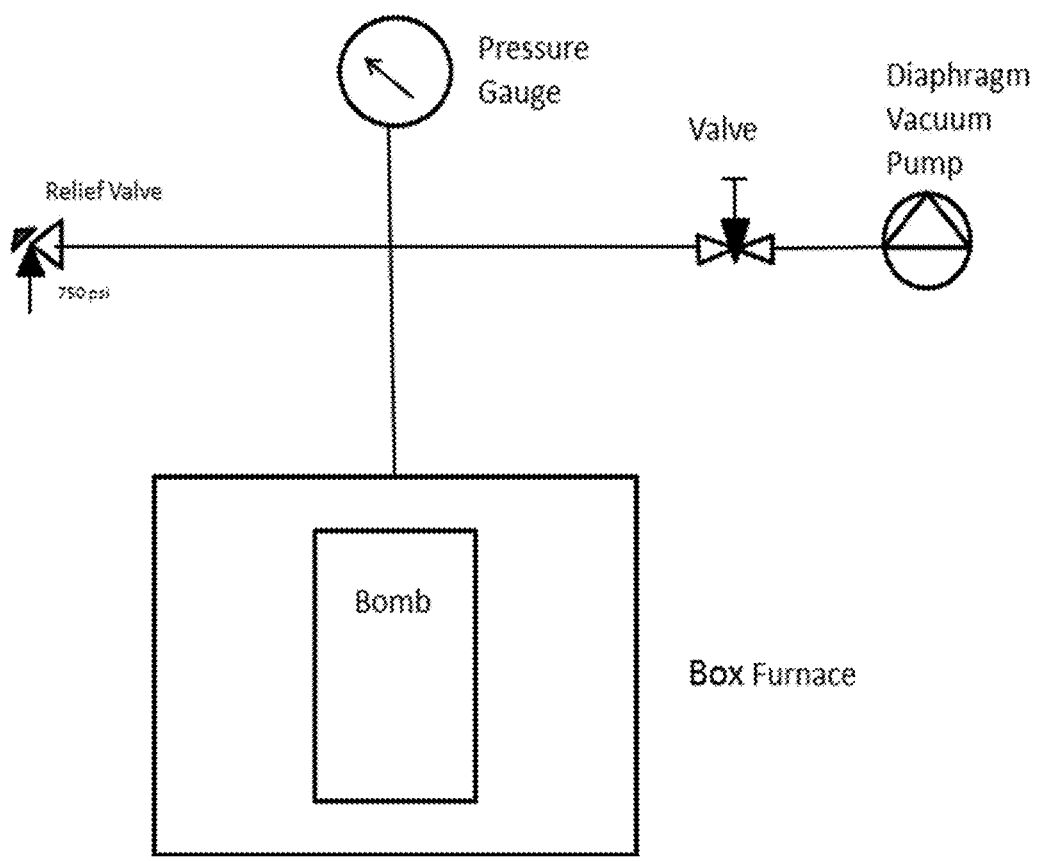

The apparatus used to intercalate the carbon with sulfur is shown in FIG. 7. It consists of a 125 ml Parr Instruments pressure vessel rated to 2500 psi with Teflon insert connected to a vacuum gauge, needle valve, vacuum line connector and a Swagelok pressure relief valve (set to relief at 750 psi). The bomb was placed into a box furnace and the gauge and valves are located outside the furnace. Should an over pressurization event occur, the relief valve would vent into the slipstream of the hood (and not the interior of the box furnace). After the bomb was loaded with carbon and sulfur, the connecting tubing was inserted through a hole in the top of the furnace and connected to the bomb. A small diaphragm style vacuum pump was used to evacuate the apparatus and then was removed once the appropriate negative pressure was reached. The pump connection was removed, the furnace was turned on and the bomb heated to appropriate heat rate ramp/soak time. During the heating and soak cycle there was active vacuum on the system. Once the cycle was complete the cooled bomb was disconnected from the apparatus and the contents removed.

To prepare the composite, the carbon was ground using mortar and pestle and sieved through a 400 mesh screen. The carbon was added to the bomb PTFE sleeve and then the sulfur was added on top. The two materials were mixed with a spatula and the bomb lid attached. The cross attachment (union with gauge, relief valve and needle/ball valve) was laced through the exhaust on the oven and attached to the top of the bomb. The apparatus was connected to a diaphragm pump and a vacuum was pulled to ~-15 inHg, and the bomb heated at 2° C./min to 160° C. and soaked for 18 hrs. After the heating/soak cycle was completed the bomb was detached and the carbon/sulfur composite removed.

A 70/30 weight ratio of sulfur to carbon is a preferred embodiment. We prepared the C/S composites in 125 ml Parr Instruments pressure vessel without any mixing. The disadvantage of this approach is that there was no agitation of the C/S mixture which results in uneven distribution of the sulfur through the carbon. To address this problem, we prepared samples in our lab-size quartz rotary furnace.

The small rotary tube is made from quartz with Pyrex tubing fittings used for vacuum operation. On the exit end trap was added in line to the vacuum pump (diaphragm type). The vacuum trap collects trace amounts of carbon released during the initiation of vacuum and collection of trace sulfur that may volatilize/sublime from the firing procedure. The exhaust from the diaphragm pump vented into the exhaust hood. The vacuum pump maintained ~-15 torr throughout the runs and samples were heated to 160° C. for 18 hrs. The tube was rotated using a DC motor. After the heating/soak cycle was completed the tube was detached and the carbon/sulfur composite removed.

Figure 8:
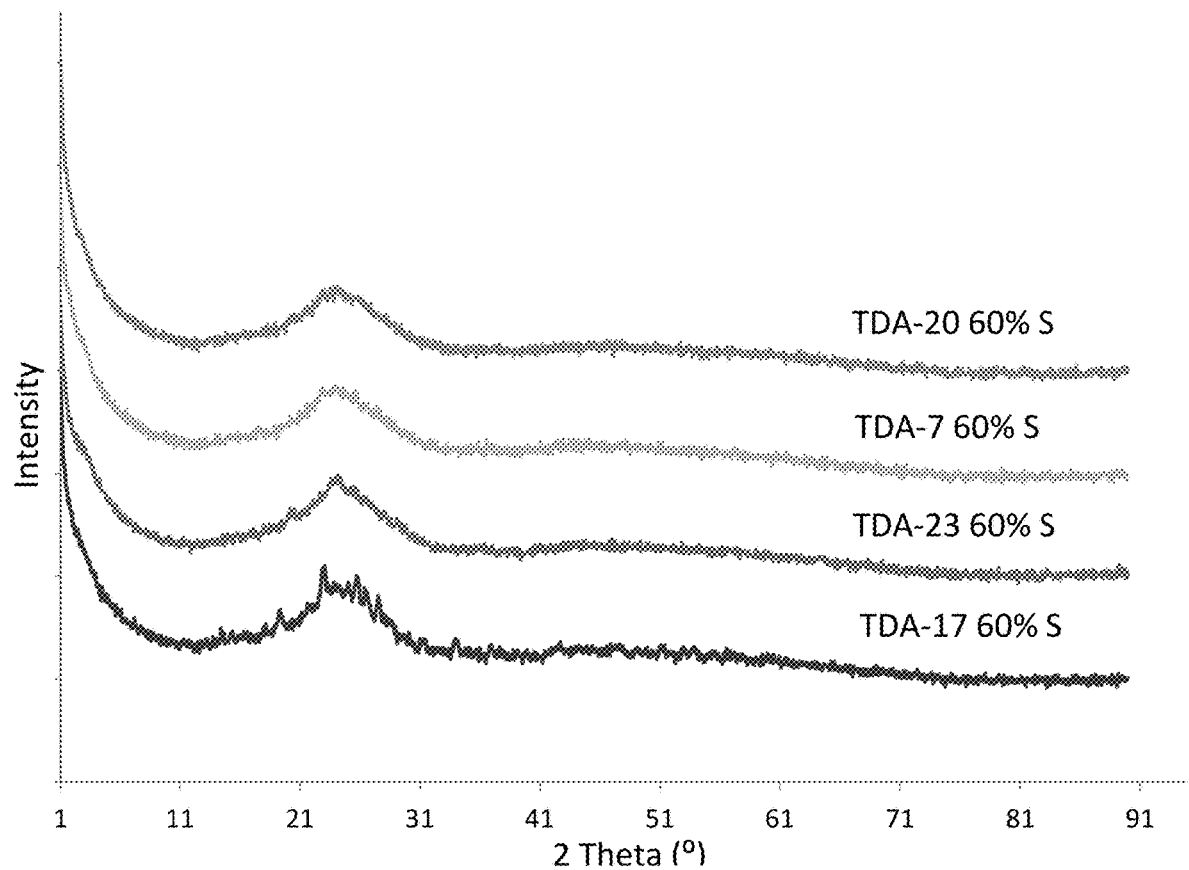
FIG. 8. XRD spectra of C/S composites at 60% sulfur loading.

The samples were characterized by XRD to determine whether sulfur was in the carbon pores or on the surface. In FIG. 8, we compare the XRDs for the lab-scale samples prepared in the pressure vessel with no agitation and the production sample prepared in the rotary furnace. The production sample shows mainly broad peaks indicating that there is little free sulfur on the surface of the carbon, while the lab sample clearly shows sharp peaks due to excess sulfur on the surface. This shows, as expect, that rotary furnace is much more effective at impregnating the sulfur into the pores of the carbon.

Table 1 shows formulations that were made using dextrose (glucose) and sucrose as the sugar source and two carbon blacks (purchased from Columbian). Raven® 410 is an industrial grade carbon black with a mean particles size of 101 nm and a BET surface area of 26 $m^2/g$. N330 is a commonly used carbon black for rubber with a particle size range of 28-36 nm and a BET surface area of 78-88 $m^2/g$.

TABLE 1

Formulations of TDA carbons.

| Sample ID | Dextrose (wt. %) | Sucrose (wt. %) | Ammonium Bicarbonate (wt. %) | Carbon Black (R410) (wt. %) | Carbon Black (N330) (wt. %) | Vegetable Oil (wt %) |
|---|---|---|---|---|---|---|
| TDA-4 | 79.37 | | 0.79 | 15.87 | | 3.97 |
| TDA-5 | 85.47 | | 1.71 | 8.55 | | 4.28 |
| TDA-6 | 78.74 | | 1.57 | | 15.75 | 3.94 |
| TDA-7 | | 80.00 | | | 16.00 | 4.00 |
| TDA-8 | | 76.19 | | | 19.05 | 4.76 |
| TDA-17 | — | 74.77 | 1.87 | | 18.69 | 4.67 |
| TDA-20 | 74.77 | | 1.87 | | 18.69 | 4.67 |
| TDA-23 | 68.97 | | 2.30 | | 22.99 | 5.75 |

The mixtures were charred at 200-220° C. in Teflon trays. Vegetable oil was added to form a paste and prevents foaming. The samples were devolatilized at 350-950° C. under nitrogen and activated at 850-1000° C. under flowing carbon dioxide. Using this approach results in high surface area carbons with higher conductivities and packing densities than are possible with conventional activated carbons or other physically mixed carbon black and activated carbon particle mixtures.

The general procedure for preparing these porous carbons was to:

Step 1: Thoroughly mix ingredients in mixer or paint shaker.

Step 2: Dry in air at 200° C.

Step 3: Carbonize under flowing nitrogen at 350-950° C.

Step 4: Activate in a rotary furnace under flowing carbon dioxide or steam at 850-1000° C. for different lengths of time.

During heating the carbohydrate decomposes to make a char that coats the carbon black particles. The carbon black is homogeneously dispersed throughout the char, preventing agglomeration of the particles. During carbonization, the char decomposes to give a high purity carbon.

The specific surface area and the pore size distribution of the carbons were measured by nitrogen adsorption on a Micromeritics Gemini VII instrument using Density Functional Theory.

Figure 10:
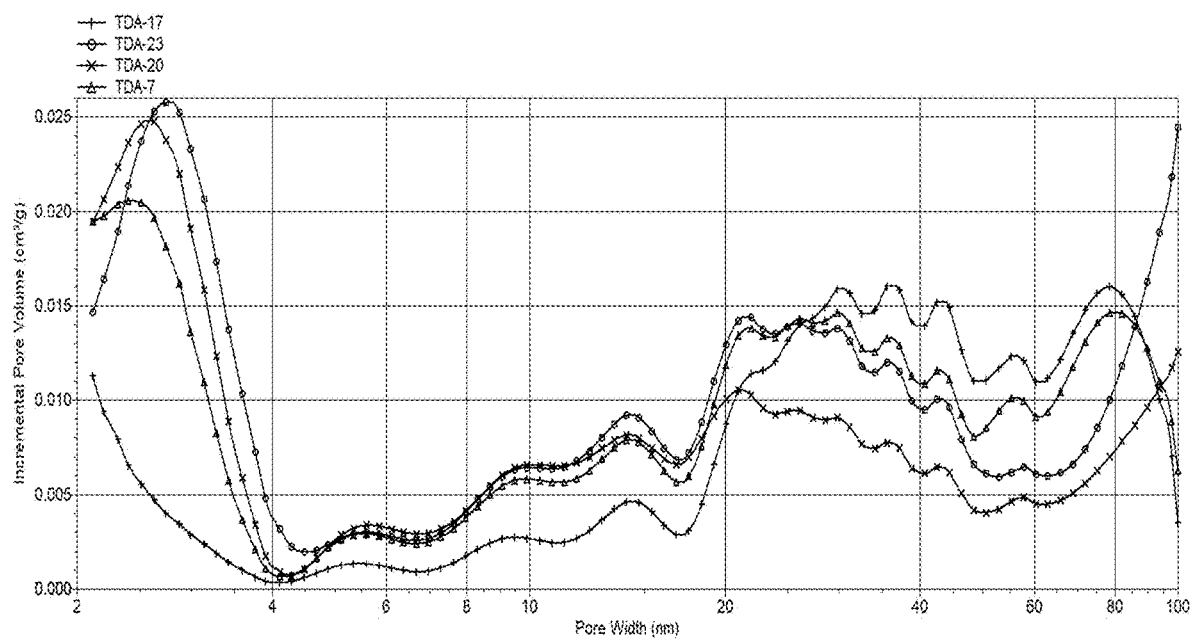
FIG. 10. Pore size distribution of carbons of the present invention in the 2-100 nm range.

These carbons have very large pore volumes which enables us to increase the sulfur loading for the composite. Table 2 shows the pore size distribution in the 2-100 nm range of representative TDA carbon samples. As shown in FIG. 10, the carbons have most of their pore volume in the 2-100 nm range. The microporosity (0-2 nm) of the carbons is influenced by the formulation and can range from 0 to 1 cc/g. Our control of the mesopore size is the key to how we engineer the pore size to contain the polysulfides in a way that will both immobilize them and allow for their expansion.

TABLE 2

Surface areas and pore volumes of TDA carbons.

| Carbon Formulation | BET Surface Area (m²/g) | Total Pore Vol. (cc/g) <100 nm diameter | Micropore Vol. (cc/g) <2 nm diameter | Pore Vol. (cc/g) 2-100 nm diameter |
|---|---|---|---|---|
| TDA-4 | 857 | 0.61 | 0.00 | 0.61 |
| TDA-5 | 1755 | 0.96 | 0.11 | 0.85 |
| TDA-6 | 1441 | 1.05 | 0.17 | 0.98 |
| TDA-7 | 1391 | 1.54 | 0.050 | 1.49 |
| TDA-8 | 1566 | 0.96 | 0.41 | 0.55 |
| TDA-17 | 1378 | 1.45 | 0.36 | 1.09 |
| TDA-20 | 1455 | 1.41 | 0.035 | 1.38 |
| TDA-23 | 1289 | 1.59 | 0.0072 | 1.58 |

Table 3 shows the elemental analysis of the carbons. TDA-7 and TDA-8 have the lowest nitrogen contents because no nitrogen compound was added to the initial formulation. TDA-20 and TDA-23 have higher nitrogen content because ammonium bicarbonate was added to the initial formulation. These carbon formulations also have sulfur because the carbon black contains bound sulfur which helps attract the polysulfides to the carbon surface.

TABLE 3

Elemental analysis of TDA carbons.

| Carbon Formulation | Carbon (wt. %) | Hydrogen (wt. %) | Nitrogen (wt. %) | Oxygen (wt. %) | Sulfur (wt. %) | Ash (wt. %) |
|---|---|---|---|---|---|---|
| TDA-4 | 97.18 | 0.31 | 0.17 | 0.77 | 1.03 | 0.34 |
| TDA-5 | 95.89 | 0.37 | 0.34 | 1.79 | 0.69 | 0.60 |
| TDA-6 | 95.88 | 0.30 | 0.29 | 1.23 | 1.22 | 0.38 |
| TDA-7 | 95.59 | 0.39 | 0.10 | 1.58 | 1.36 | 0.78 |
| TDA-8 | 96.01 | 0.31 | 0.08 | 1.41 | 1.35 | 0.81 |
| TDA-17 | 94.00 | <0.5 | 0.14 | 3.81 | 0.68 | 0.40 |
| TDA-20 | 95.52 | <0.5 | 0.33 | 1.72 | 1.20 | 0.31 |
| TDA-23 | 95.46 | <0.5 | 0.32 | 1.84 | 1.41 | 0.30 |

Figure 11:
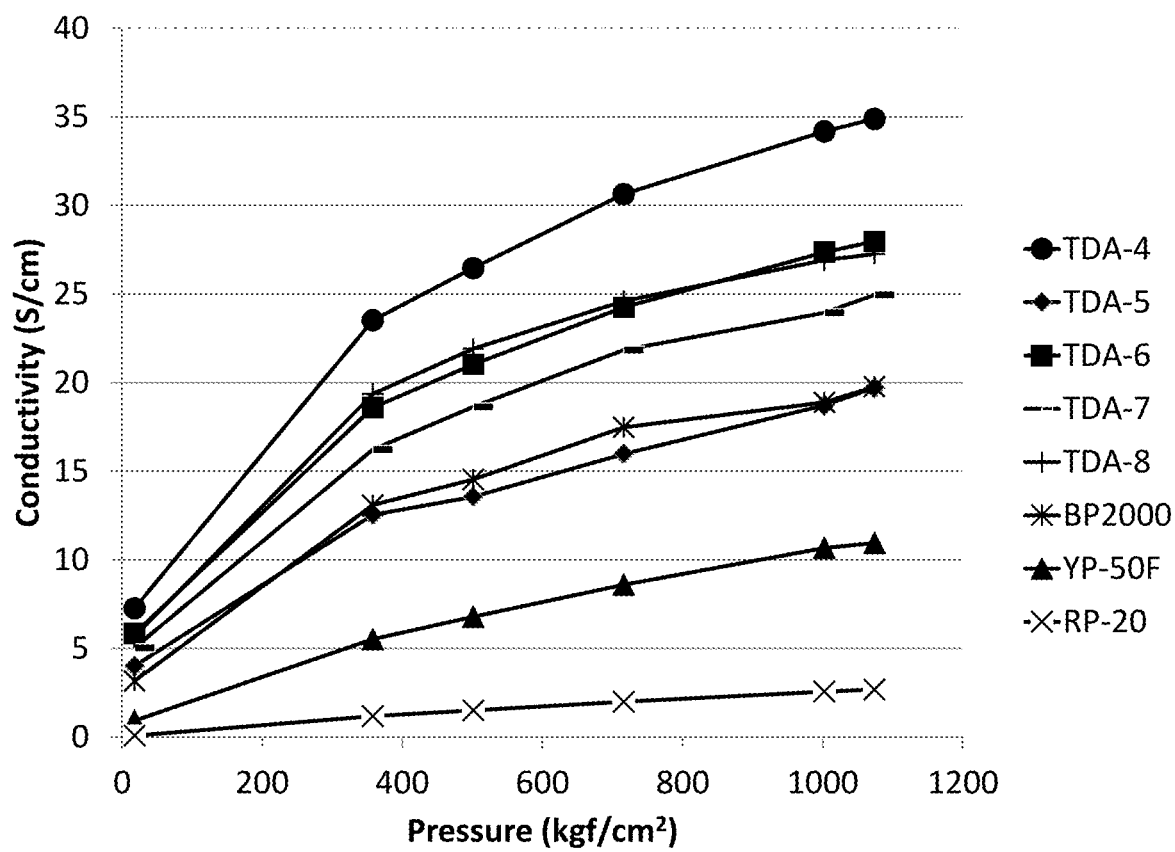
FIG. 11. Comparison of the electrical conductivity of carbons of the invention, with commercial high surface areas carbon black (Cabot's BP2000) and commercial activated carbons (Kuraray's YP-50Y and RP-20).

To determine the electrical conductivity of the carbon powder themselves, the bulk conductivity of the porous carbons was measured as a function of pressure (FIG. 11). The results are shown in Table 4 at a compression force of 500 kgf/cm² on the dry powder. Higher surface area carbons typically have lower density because they are more porous, but they do not pack into high density materials. The packing densities of the carbons of this invention are much higher than those of the commercial high surface area carbon blacks (BP2000). In an embodiment, the packing density is at least 0.8 g/cc at 500 kgf/cm². More preferably, the packing density is at least 1.0 g/cc at 500 kgf/cm².

TABLE 4

Characteristics of Exemplary Carbons of the Invention and a commercial carbon black.

| Sample ID | Packing Density @ 500 kgf/cm² (g/cc) | Conductivity @ 500 kgf/cm² (S/cm) | BET Surface Area (m²/g) |
|---|---|---|---|
| TDA | | | |
| TDA-4 | 1.30 | 27 | 857 |
| TDA-5 | 1.05 | 14 | 1755 |
| TDA-6 | 0.87 | 21 | 1441 |
| TDA-7 | 1.04 | 19 | 1611 |
| TDA-8 | 1.12 | 22 | 1566 |
| Cabot | | | |
| BP-2000 | 0.53 | 17 | 1563 |

Preparation of carbon matrix-sulfur (C/S) composites. C/S composites were made by mixing powdered sulfur with the carbon matrix and heating the mixtures under dynamic vacuum at 160° C. in a rotary furnace. The product was screened through a 325-400 mesh screen.

XRD is a quick and convenient method for determining whether the sulfur is in the carbon pores or on the surface. In FIG. 8 are shown the XRD patterns for all of the carbons with 60% loading of sulfur. C/S composites based on carbons TDA-23, TDA-7 and TDA-20 showed only broad peaks indicating that there is no free sulfur on the surface of the carbon while TDA-17 clearly shows peaks from sulfur. TDA-17 has mainly pores less than 2 nm and the S does not appear to adsorb effectively into these small pores. The others have the majority of their pore volume in pores 2 nm or larger in diameter and readily hold the S (and generally less than 100 nm, preferably less than 50 nm.

Pouch cell fabrication: Cells were fabricated using methods known to those skilled in the art and tested in a typical constant current profile. The TDA C/S composites were mixed with carbon and binder solution and the slurry was coated on both sides of an aluminum substrate. Cathodes were made with binder and cells tested with standard electrolyte without any additives to enhance cycle life. Single stack cells consisting of a double sided cathode and a lithium foil anode, separated by a microporous separator were used. They were vacuumed filled with a non-aqueous electrolyte to activate the cells, and then sealed.

Figure 9:
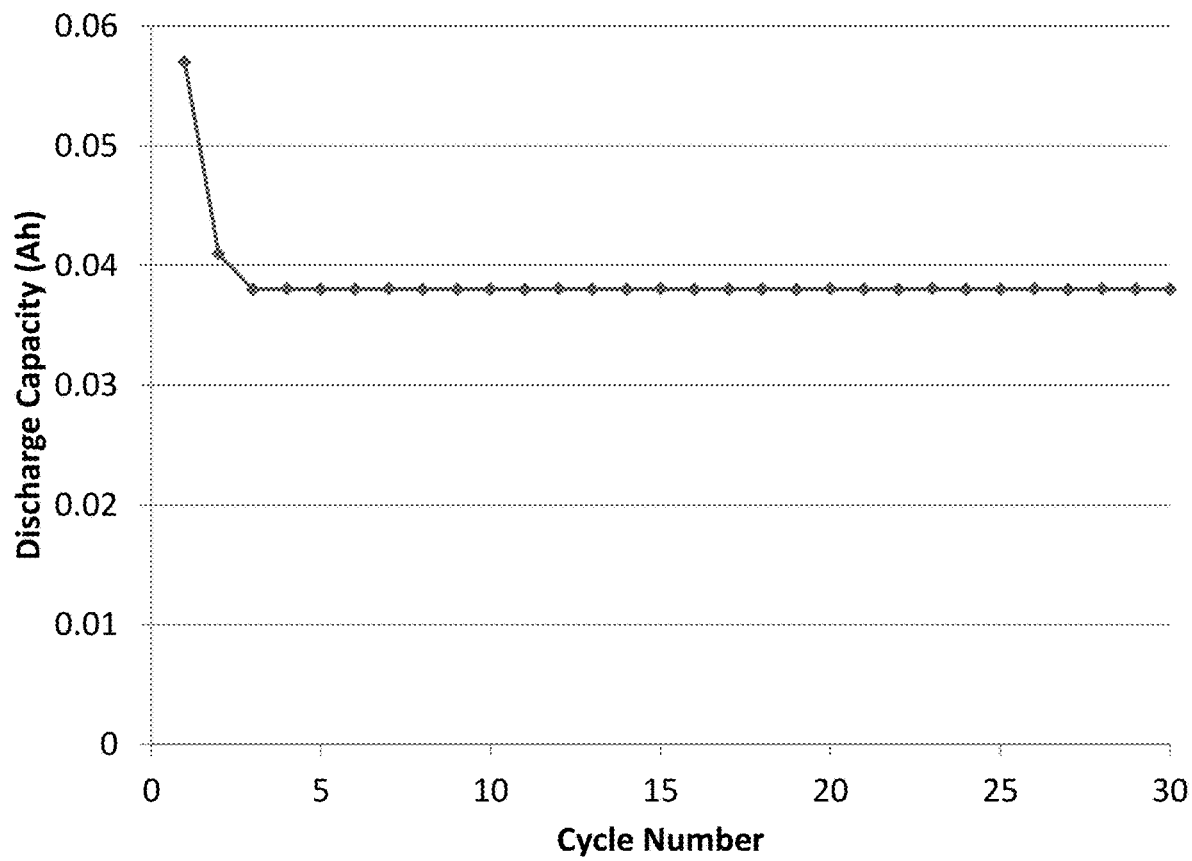
FIG. 9. Cycling performance of cathode with 70% sulfur loading.

The results of this testing are shown in FIG. 9. After an initial drop, the C/S electrode demonstrated a high capacity that was maintained throughout the test cycles.

Example: Preparation of Carbon Matrix

The general procedure for preparing these porous carbons was to:

Step 1: Thoroughly mix ingredients in mixer or paint shaker.

Step 2: Dry in air at 200° C.

Step 3: Carbonize under flowing nitrogen at 350° C.

Step 4: Activate in a rotary furnace under flowing carbon dioxide or steam at 950° C. for different lengths of time.

Example: Fill Mesopores with Sulfur Active Material

The carbon matrixes were filled with the active material (sulfur) by mixing sulfur to carbon weight ratios ranging from 50/50 to 80/20. The mixtures were heated under dynamic vacuum at 160° C. for 2-18 hours in a rotary furnace.

Method: Electrical Conductivity Measurements

To determine the electrical conductivity of the carbon powder themselves, the bulk conductivity of the activated carbons was measured as a function of pressure using a four probe technique and a plastic fixture with two copper rod electrodes. The pressure was applied using a Carver lab press. The press platens were modified with a piece of epoxy bench top on each platen to provide electrical insulation for the electrodes. A ½" hole was drilled through a ~3"×2" diameter block of plastic. The block held the two ½" copper rods inserted from both ends.

Example procedures used:

1. Length calibration—the fixture without sample was mounted in the lab press and the distance between the two electrode ends was measured with the calipers to 0.1 mm at various pressures.
2. The fixture was tared to 0.01 g on the scale. One electrode was removed from the fixture and the carbon sample was added. The electrode was reinserted and hand compressed. Excess carbon was wiped off the fixture and the fixture and sample were weighed. The sample weight was determined by difference.
3. The fixture with sample was mounted into the lab press. Leads from the Versastat (current source) and multimeter (voltage measurement) were connected to both electrodes.
4. The lab press was compressed. The Versastat was set for a constant current output at a level of 1-100 mA, in order to have a voltage response of about 0.1-1 V. The current was turned on and the voltage recorded. The length between the platens was measured with the calipers.
5. Step 4 was repeated at increasing pressures.
6. Calculations: The length of sample was determined by difference between length measurement and blank measurement at the same applied pressure.
   a. Density (g/cc) at given pressure—

Volume (cc)=((0.5/2*2.54)^2*π)*length/10

Density (g/cc)=mass (g)/volume (cc)

b. Conductivity (S/cm) at given pressure—

Resistance (ohm)=Voltage (V)/Current (A)

Conductivity (S/cm)=Length/10/((0.5/2*2.54)^2*π*Resistance)

c. PSI (lbs/int)—

Lbs/((0.5/2)^2*π)

The present invention provides at least the following benefits: high conductivity, large pore volumes, high surface areas, high packing densities, can be incorporated with nitrogen and sulfur, stable cycling performance when used as electrodes in a Li—S battery, bound sulfur to hold the polysulfides onto the carbon surface

The invention claimed is:

1. A porous carbon, comprising:
   a. a nitrogen BET surface area of about 850 to 1800 m$^2$/g;
   b. a packing density of at least 0.8 grams per cubic centimeter as determined at a compressive force of 500 kgf/cm$^2$ on dry carbon powder; and
   c. an electrical conductivity of a least 10 S/cm at a compressive force of 500 kgf/cm$^2$ on dry carbon powder.

2. The porous carbon of claim 1 with a carbon content of at least 94 weight %.

3. The porous carbon of claim 1 with a sulfur content of at least 0.6 weight %.

4. A carbon matrix-sulfur composite, wherein the carbon matrix comprises the porous carbon of claim 1, wherein sulfur is deposited into the pores of the carbon matrix, and the sulfur content is at least 50 weight % of the carbon matrix-sulfur composite.

5. The carbon matrix-sulfur composite of claim 4, wherein the sulfur is deposited inside 2-100 nanometer-diameter pores in the carbon matrix.

6. The carbon matrix-sulfur composite of claim 4, wherein the sulfur is at least 70 weight % of the carbon matrix-sulfur composite and the sulfur is deposited inside 2-100 nanometer-sized pores in the carbon matrix.

7. A cathode for a lithium-sulfur battery comprising the carbon matrix-sulfur composite of claim 4.

8. A lithium-sulfur battery comprising the cathode of claim 7.

9. The porous carbon of claim 1, wherein the packing density is at least 1.0 grams per cubic centimeter at 500 kgf/cm$^2$.

10. The porous carbon of claim 1, wherein pore volume of pores from 2 to 100 nm is at least 0.5 cubic centimeters per gram.

11. The porous carbon of claim 10, wherein pore volume of pores from 2 to 100 nm is at least 1.0 cubic centimeters per gram.

12. An activated carbon-coated carbon black material made by the steps of:
    a. providing a plurality of carbon black particles, a carbohydrate in the form of a refined sugar, and an oil;
    b. coating the plurality of carbon black particles with the carbohydrate and the oil;
    c. carbonizing the carbohydrate, which is coated on the plurality of carbon black particles, under a nitrogen atmosphere; and
    d. activating the carbohydrate, which is carbonized on the plurality of carbon black particles, under a steam or carbon dioxide atmosphere.

13. A carbon matrix-sulfur composite, wherein the carbon matrix is made by the steps of claim 12, and a carbon matrix-sulfur composite is made by the additional steps of:
    a. providing a sulfur powder;
    b. mixing the carbon matrix with the sulfur powder;
    c. placing the carbon matrix with the sulfur powder inside a pressure vessel;
    d. pulling a vacuum on the pressure vessel;

e. heating the pressure vessel to at least 150 degrees Celsius; and f. heating the carbon matrix and the sulfur powder for a period of time to allow sulfur to deposit inside pores with a diameter from 2 to 100 nm.

14. A cathode for a lithium-sulfur battery comprising the carbon matrix-sulfur composite of claim 13.

15. A lithium-sulfur battery comprising the cathode of claim 14.

* * * * *